United States Patent [19]

O'Donnell, Jr. et al.

[11] Patent Number: 5,845,647

[45] Date of Patent: Dec. 8, 1998

[54] TOBACCO AND RELATED PRODUCTS

[75] Inventors: Francis E. O'Donnell, Jr., St. Louis, Mo.; Jonnie R. Williams, Goochland County, Va.

[73] Assignee: Regent Court Technologies, Chesterfield, Mo.

[21] Appl. No.: 671,718

[22] Filed: Jun. 28, 1996

Related U.S. Application Data

[60] Provisional application Nos. 60/003,186, Sep. 5, 1995, 60/009,932, Jan. 16, 1996, and 60/015,933, Apr. 22, 1996.

[51] Int. Cl.$^6$ ..................................................... A24B 15/30
[52] U.S. Cl. ............................................ 131/276; 131/275
[58] Field of Search .................................. 131/332, 331, 131/276, 275; 260/102

[56] References Cited

U.S. PATENT DOCUMENTS

| | | | |
|---|---|---|---|
| 3,901,248 | 8/1975 | Lichtneckert et al. | 131/359 |
| 4,317,837 | 3/1982 | Kehoe et al. | 426/3 |
| 4,382,886 | 5/1983 | Sognowski | 260/107 |
| 4,802,498 | 2/1989 | Ogren | 131/359 |
| 5,417,229 | 5/1995 | Summers et al. | 131/275 |
| 5,451,401 | 9/1995 | Zerby et al. | 131/276 |
| 5,488,976 | 2/1996 | Lorenz et al. | 139/383 AA |
| 5,698,253 | 12/1997 | Dekker et al. | 131/276 |
| 5,752,529 | 5/1998 | Mane et al. | 131/276 |

OTHER PUBLICATIONS

The Merck Edition—Seventh Edition—p. 861—Propolis Definition.

*Primary Examiner*—Aaron J. Lewis
*Attorney, Agent, or Firm*—Sughrue, Mion, Zinn, Macpeak & Seas, PLLC

[57] ABSTRACT

Tobacco products improved by the use of uncured, green tobacco and propolis for use in smoking tobacco, chewing tobacco, tobacco chewing gum, beverages and foods. In one preferred embodiment green tobacco provides reduced carcinogenic nitrosamines. In another preferred embodiment, the addition of propolis reduces bitterness, prolongs flavor and shelf life, and reduces tar and particulate content. The tobacco products can be used to reduce smoking withdrawal symptoms such as irritability and weight gain by providing nicotine and monoamine oxidase B inhibitor. Further, the invention can be used to treat Alzheimer's disease and to manage weight control in non-smokers.

30 Claims, No Drawings

TOBACCO AND RELATED PRODUCTS

CROSS-REFERENCE TO RELATED APPLICATIONS

This is a regular, nonprovisional patent application claiming priority to previous provisional applications, those being: Ser. No. 60/003,186, filed Sep. 5, 1995; Ser. No. 60/009,932, filed Jan. 16, 1996; and Ser. No. 60/015,933, filed Apr. 22, 1996.

BACKGROUND OF THE INVENTION

This invention relates generally to an improved tobacco product, and more specifically to tobacco product enhanced with propolis.

Chewing gums that have been altered to include nicotine and other flavoring components have been available in the art. Ordinary chewing gum has been used as a substitute for smoking tobacco with marginal success. In a smoke-free environment, the oral gratification provided by chewing gum can only somewhat ease the smoker's craving for tobacco smoke. In U.S. Pat. No. 3,901,248, a cation exchange resin, nicotine-containing chewing gum is described. Unfortunately, the gum has poor taste. U.S. Pat. No. 3,877,468 discloses the addition of nicotine without a time-release cation-exchange resin. However, the gum had poor chewing characteristics because of a 40% by weight minimum gum base content. Alternatively, in U.S. Pat. No. 5,488,976, a chewing gum with not more than 25% by weight gum base is described with up to 0.4 mg of nicotine added. It is described as having good chewing characteristics and flavor with sustained release of nicotine into the saliva. These prior art chewing gums have all used variable amounts of nicotine to help the smoker reduce his craving for nicotine and smoking. Further, by providing a step-down program of graded reduction in nicotine content, these prior art inventions have offered a way for the smoker to break the smoking habit.

Others have described various inventions wherein tobacco rather than nicotine has been added to chewing gum. In U.S. Pat. No. 4,317,837, issued to Kehoe, for example, tobacco is added to a chewable gum base having at least 10% air voids entrapped. Later, Ogren, in U.S. Pat. No. 4,802,498, taught the addition of propolis resin to a chewing gum-tobacco leaf mixture. This enhanced the flavor of the tobacco chewing gum mixture. It reduced the bitterness of the tobacco in the gum. Essentially, tobacco was added as a flavoring ingredient to gum and the propolis was a minor ingredient. In that style of tobacco-chewing gum, the propolis was proposed as a breath freshener, with mild anesthetic properties to decrease the irritation caused by chewing tobacco. Hence in this prior art device, to achieve these attributes, the propolis was merely an adjuvant and not a major ingredient, as is the tobacco.

SUMMARY OF THE INVENTION

The present invention includes a chewing gum, and more specifically, in one embodiment, a gum base to which is added a finely ground or particulate, powdery ingredient comprising the pulverized or powdered tobacco that is produced when tobacco is chopped. The principle of this invention is to provide a gum base which, during its intermixing into a chewing gum base, may have added to it a finely ground powder of pure tobacco in order to provide the tobacco flavor to the gum.

Another object of the invention is to provide a chewing gum that is flavored with a tobacco powder or dust which provides enhanced tobacco flavor when chewed but minimizes the user's exposure to nicotine since the tobacco maintains its physical attributes because it is added as a powder or dust.

Yet another object of the invention is to use propolis by directly applying it to tobacco in order to favorably alter its flavor.

Another object of the invention is to add propolis to the tobacco to reduce the articulate and tar content of the tobacco for smoking.

A further object of the invention is to enhance tobacco, particularly "uncured", so-called "green" tobacco, to produce a tobacco product that has reduced carcinogenic nitrosamine content.

Still another object of the invention is to spray whole tobacco leaf, either green or cured, with propolis or dip whole tobacco leaf, either green or cured in propolis, in order to make smoking tobacco or chewing tobacco have a more mellow and less bitter flavor, with minimum after taste.

Another object of the present invention provide a propolis-treated tobacco chop to be added to a chewing gum or other product in an adjustable ratio that modulates the nicotine content and the content of monoamine oxidase B inhibitor.

Yet another object of the invention is to provide a chewing gum or other product in which the propolis-tobacco chop acts as a reservoir for sustained release of nicotine and monoamine oxidase B inhibitor and for prolongation of flavor.

Another object is to provide a tobacco-containing chewing gum wherein propolis-treated tobacco chop of variable nicotine content is added to a small quantity of chewing gum (1.2 to 3.5 g) so that the total nicotine content is less than 1.0 mg per piece of gum and wherein the natural tobacco may contain monoamine oxidase B inhibitor such as found in tobacco smoke.

Still another object of the invention is to provide a method of controlling weight gain in a non-smoker by providing controlled delivery of nicotine and monoamine oxidase B inhibitor in a tobacco product.

The principal of this invention is to provide a gum base, which during intermixing into a chewing gum base may have added to it a very finely ground powder of pure tobacco in order to provide the tobacco flavor to the gum when chewed. In addition it also may include other flavoring ingredients to provide a hint of other flavors added to the tobacco taste. The gum is manufactured by adding a precise amount of processed or green natural tobacco leaf to the raw gum batch. During the manufacture of cigarettes, for example, the tobacco is chopped and a dust-like by-product is created. This tobacco has a flour-like texture which can be added directly to the gum base.

Also generally described is the novel use of propolis to enhance tobacco. In one instance, propolis is mixed in a solution, whether it be a water base or oil base solution, and applied to the whole tobacco leaf or chopped tobacco. It can be applied by spray or by dipping in order to provide for a degree of coating or even saturation. The propolis works to enhance favorable aspects of tobacco when smoked or when chewed. When used on tobacco chop, before it is added to gum, it enhances the richness and duration of the flavor of the tobacco-chewing gum mixture.

Propolis-tobacco chop, tobacco extract or tobacco chop can be added to coffee or tea before brewing for creation of a tobacco flavored beverage. Alternatively, the propolis-tobacco chop, tobacco extract or tobacco chop alone can be added to a cup of the brewed beverage so as to allow individual adjustment to the consumer's taste. Propolis also can be added to other food products to reduce bitterness and unpleasant aftertaste and to prolong the favorable and flavorful experience during consumption.

Another embodiment of the present invention is a tobacco containing gum that is designed to reduce the craving for tobacco smoke or tobacco chew by providing a sustained release of nicotine and monoamine oxidase B inhibitor from propolis-treated tobacco chop mixed into a chewing gum with less than 30% by weight gum base. As opposed to the addition of propolis to the gum base (Ogren, U.S. Pat. No. 4,802,498), the present invention pre-treats the tobacco chop. This causes sustained release of the tobacco content over a 45 minute interval avoiding unpleasant peaks of nicotine, while prolonging the flavor of the gum. When incorporated into a small chicalet-like quantity of gum, the total nicotine content is below 0.2 mg per stick (FDA guidelines), but the end user can comfortably chew two or more pieces at one time to accommodate his craving for a tobacco product.

DESCRIPTION OF THE PREFERRED EMBODIMENT

One preferred embodiment of the invention relates to tobacco chewing gum, which is formulated from a gum base. The traditional composition that makes up a standard gum base includes, as ingredients, sugar, gum substances, corn syrup, dextrose, softeners, sorbitol and other natural or artificial flavorings. In this invention, perhaps minus the sweeteners, a minority quantity of tobacco of a tobacco source is added in order to provide the tobacco flavoring and taste. A low nicotine tobacco additive chewing gum is the end product.

The tobacco chewing gum is manufactured by adding a precise amount of processed or green tobacco leaf, the tobacco source, to the raw gum base described above. In the preferred embodiment, the dust-like powdery tobacco that results from tobacco chopping is used. This powder can be added directly to a batch of gum base. In a preferred embodiment, approximately 1% to approximately 5% by weight of the tobacco dust is incorporated into gum base. The resulting mixture can be further flavored if so desired. The gum base then can be divided and formed into individual sticks or pieces of gum.

By adjusting the amount of tobacco additive, the tobacco-chewing gum mixture can vary in strength from mild to full-flavor. Further, the gum can be used as an adjunct to smoking tobacco or chewing tobacco to assist in the cessation or reduction of smoking or chewing tobacco. Moreover, since the gum of the present invention is processed for chewing enjoyment and not for lingual or buccal lodging, it reduces the potential for localized carcinogenic effects on the oral mucous membranes.

In another embodiment of the invention, propolis is applied directly to a tobacco source, generally tobacco leaf or tobacco chop, to enhance its flavor. Propolis, also known as bee bread or hive dross, is a resinous substance found in bee hives. It is collected by bees from the outer surface of pollen granules. Its uses may be manifold in chemistry, pharmacy and food sciences. It has a greenish-brown sticky mass, with an aromatic odor. Its extraction with alcohol yields a propolis wax. The residue from the alcohol extraction is called propolis resin, yielding propolis balsam on extraction with hot petroleum ether. Propolis balsam has a hyacinth odor and is said to contain 10% cinnamyl alcohol. In this particular invention, the whole tobacco leaf is sprayed or dipped in a propolis solution. A tincture of propolis is used, preferably in an approximately 0.1 to 10% liquid. The liquid can be an aqueous solution, an oil-based mixture, such as canola oil or any other appropriate liquid. The amount of propolis is in the order of 1 to 10 ounces per one hundred pounds of tobacco treated. The propolis solution or tincture is applied to the tobacco for the purpose of reducing the bitterness of its taste and to prolong the favorable aftertaste of the tobacco. The tobacco source with the propolis has a number of applications, as will be explained below, with the treated tobacco source in the end tobacco product being on the order of 0.01% to 5% of the total weight of the finished product.

The propolis-treated tobacco leaf of this invention may be used as a smoking tobacco or chewing tobacco. We have determined that propolis reduces the tar and particulate content of smoke inhaled by the smoker. The range of reduction is 10 to 30%. Despite the reduction in tar and particulate content, the flavor of the cigarette or cigar remains intact. Whereas, when a filter is used to reduce the tar and particulate content, there is a corresponding deterioration of the tobacco flavor.

Moreover, adding the propolis provides for enhanced flavor with reduced bitterness in other consumables. For example, the present invention contemplates that a propolis-tobacco source can be added to coffee or tea before brewing to create a tobacco-flavored beverage. Alternatively the propolis-tobacco can be added to a cup of the brewed beverage so as to allow individual adjustment of the tobacco flavor to the consumer's preference. It will be appreciated also that another tobacco source such as tobacco extract or untreated tobacco chop or powder can be added to the beverages, as just described, to create a tobacco-flavored beverage. Further, propolis solution may be added to other food products such as in order to enhance the taste and prolong the flavor.

In another preferred embodiment, the tobacco source for various tobacco products is uncured or so-called "green tobacco" which is harvested and then undergoes its natural color transformation to a yellow appearance as the chlorophyll is converted to sugars. Uncured tobacco has significantly lower nitrosamine levels. Unfortunately, uncured tobacco has a relatively bitter, unpleasant flavor. This "green tobacco" is then treated with propolis in order to make it usable for smoking tobacco or in gums or beverages. If it is desired to impart a richer tobacco flavor, a small quantity of tobacco extract can be sprayed on the "green tobacco" leaf with the propolis. This may result in some increase in the nitrosamine levels, but far less that in cured tobacco as conventionally used for smoking and chewing purposes.

Another preferred embodiment of the present invention includes a tobacco product comprising a tobacco-containing chewing gum wherein the tobacco source is treated with propolis. We have determined that propolis is a better gum softener than is sorbitol and that it extends the shelf life of the product at least two or three times longer that sorbitol which hardens over time. Thus, the propolis can be used in a chewing gum, sans tobacco, as a softener. Further, the propolis enhances flavor, as described above. In general, this embodiment comprises a tobacco-containing chewing gum wherein propolis-treated tobacco source, for example tobacco chop, of variable nicotine content is adds to a small quantity of chewing gum (1.2 to 3.5 g) so that the total nicotine content is less than 1 mg per piece of gum and wherein the natural tobacco source may contain a monoamine oxidase B inhibitor, such as that found in tobacco smoke. The preferred embodiment includes 1.4 g of chewing gum with 30 mg of propolis-treated tobacco chop containing 0.19 mg of nicotine with a gum base of 24% by weight. The propolis-treated tobacco chop consists of 1 to 10 ounces of propolis per 100 pounds of tobacco. The propolis can be added to the tobacco by spraying or by dipping.

The nicotine and monoamine oxidase B inhibitor content can be adjusted by adding more propolis-treated tobacco or chop or by using tobacco strains with higher nicotine content. For example, the addition of 150 mg of propolis-treated tobacco chop would result in just 10% by weight tobacco with approximately 1 mg of nicotine. Alternatively, some strains of tobacco leaf yield in excess of 0.14 mg of nicotine per 12 mg of tobacco and these can be used to modulate the chewing gum's nicotine content.

The afore-stated propolis-treated tobacco gum can be used to control smoking as well as suppressing the appetite to facilitate weight control in smokers who are trying to give up smoking and also in non-smokers. It is known that nicotine is an effective appetite suppressant. It will be appreciated by those skilled in the art that monoamine oxidase inhibitors also act as antidepressants. The present invention, therefore, provides an antidepressant effect. This effect also reduces the probability that a depressive state with excessive weight gain will be induced by cessation of smoking supplemented by the present invention.

Also, the various preferred embodiments of the present invention provide a healthier form of nicotine to suppress the progression of Alzheimer's disease. It is known that nicotine can suppress the progression of the disease. However, heretofore there has not been an safe and effective way of administering controlled levels of nicotine to the patient suffering from Alzheimer's disease. The amount of nicotine given to help control and suppress the disease can be titrated by the treating physician by providing one of the afore described novel products.

It will be apparent to those skilled in the art that various changes and modifications may be made in the preferred embodiments without departing from the scope of the appended claims. Therefore, the foregoing description is intended to be illustrative only and should not be viewed in a limiting sense.

We claim:

1. A method of enhancing the flavor of tobacco containing products comprising adding propolis to a tobacco material in an amount effective to provide a less bitter tobacco flavor before the tobacco material is incorporated into the tobacco containing product.

2. The method of claim 1 wherein the tobacco containing product is selected from the group comprising cigarettes, cigars and chewing tobacco.

3. The method of claim 1 wherein the tobacco containing product is a chewing gum.

4. The method of claim 1 wherein the tobacco material is cured tobacco.

5. The method of claim 1 wherein the tobacco material is uncured tobacco.

6. A process for enhancing the flavor of tobacco used in a tobacco product comprising adding propolis to a tobacco material before incorporating the tobacco material into the tobacco product, the propolis being added as approximately 1 to 10 ounces of propolis per 100 pounds of tobacco which amount of propolis is effective to provide a less bitter tobacco flavor.

7. The process of claim 6 wherein the tobacco is cured.

8. The process of claim 6 wherein the tobacco is uncured.

9. The process of claim 6 wherein the propolis is contained in a liquid that is sprayed on the tobacco.

10. The process of claim 6 wherein the propolis is contained in a liquid and the tobacco is dipped in the liquid.

11. The process of claim 6 wherein the propolis is contained in solution containing approximately 0.1% to approximately 10% propolis by weight in water.

12. The process of claim 6 wherein the propolis is contained in oil-based liquid containing approximately 0.1% to approximately 10% propolis by weight in an oil.

13. A method of making a tobacco-flavored beverage comprising:
combining an amount of propolis effective to provide a less bitter tobacco flavor and a tobacco material with tea to form a tobacco-flavored beverage;
and brewing said beverage.

14. The method of claim 13 wherein the tobacco material is a finely divided tobacco.

15. A method of making a tobacco-flavored beverage comprising:
combining an amount of propolis effective to provide a less bitter tobacco flavor and a tobacco material with coffee to form a tobacco-flavored-beverage;
and brewing said beverage.

16. The method of claim 15 wherein the tobacco material is a finely divided tobacco.

17. The method of claim 15 wherein the tobacco material is a tobacco extract.

18. A method of making a tobacco-flavored beverage comprising:
brewing a beverage from a tea; and
combining an amount of propolis effective to provide a less bitter tobacco flavor and a tobacco material with the brewed tea.

19. The method of claim 18 wherein the tobacco material is a finely divided tobacco.

20. The method of claim 18 wherein the material is a tobacco extract.

21. A method of making a tobacco-flavored beverage comprising:
brewing a beverage from a coffee; and
combining an amount of propolis effective to provide a less bitter tobacco flavor and a tobacco material with the brewed coffee.

22. The method of claim 21 wherein the tobacco material is a finely divided tobacco.

23. The method of claim 21 wherein the tobacco material is a tobacco extract.

24. A tobacco-containing product selected from the group consisting of cigarettes, cigars, chewing tobacco, coffee and tea, comprising
a tobacco material, and
an amount of propolis effective to provide a less bitter tobacco flavor.

25. The tobacco-containing product of claim 24, wherein the propolis is present in an amount of approximately 1 to 10 ounces of propolis per 100 pounds of tobacco material.

26. The tobacco-containing product of claim 24, wherein the product is a cigarette.

27. The tobacco-containing product of claim 24, wherein the product is a cigar.

28. The tobacco-containing product of claim 24, wherein the product is chewing tobacco.

29. The tobacco-containing product of claim 24, wherein the product is coffee, and the tobacco-containing material is a finely divided tobacco or a tobacco extract.

30. The tobacco-containing product of claim 24, wherein the product is tea, and the tobacco-containing material is a finely divided tobacco or a tobacco extract.

* * * * *